United States Patent
Koide (10) Patent No.: US 10,598,478 B2
(45) Date of Patent: Mar. 24, 2020

(54) DEFORMATION DETECTING DEVICE AND DIAGNOSIS SYSTEM

(71) Applicant: Hitachi, Ltd., Chiyoda-ku, Tokyo (JP)

(72) Inventor: Akira Koide, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 15/767,263

(22) PCT Filed: Oct. 6, 2016

(86) PCT No.: PCT/JP2016/079725
§ 371 (c)(1),
(2) Date: Apr. 10, 2018

(87) PCT Pub. No.: WO2017/065074
PCT Pub. Date: Apr. 20, 2017

(65) Prior Publication Data
US 2019/0056211 A1 Feb. 21, 2019

(30) Foreign Application Priority Data
Oct. 16, 2015 (JP) ................................ 2015-204794

(51) Int. Cl.
*G01B 7/00* (2006.01)
*G01B 7/16* (2006.01)
*G01B 1/00* (2006.01)

(52) U.S. Cl.
CPC ................ *G01B 7/16* (2013.01); *G01B 1/00* (2013.01); *G01B 2210/58* (2013.01)

(58) Field of Classification Search
CPC ......... G01B 7/16; G01B 1/00; G01B 2210/58
(Continued)

(56) References Cited

U.S. PATENT DOCUMENTS 3,969,927 A 7/1976 Yoshida et al.
4,056,742 A 11/1977 Tibbetts
(Continued)

FOREIGN PATENT DOCUMENTS

JP 50-38575 A 4/1975
JP 52-133208 A 11/1977
(Continued)

OTHER PUBLICATIONS

International Search Report (PCT/ISA/210) issued in PCT Application No. PCT/JP2016/079725 dated Dec. 27, 2016 with English translation (four pages).
(Continued)

*Primary Examiner* — Max H Noori
*Assistant Examiner* — Masoud H Noori
(74) *Attorney, Agent, or Firm* — Crowell & Moring LLP (57) ABSTRACT

In the related art, no consideration is given to a configuration of a deformation detecting device, an installation place or an installation method for the measurement target. Therefore, there is provided a deformation detecting device including a film-like elastic body which has a first surface to be adhered to a measurement target and a second surface opposite to the first surface, and in which the second surface has at least one set of a recess portion and a projection portion in a first direction in a state where the first surface is adhered to the measurement target before deformation; a first electrode formed in a region of the recess portion of the second surface; a second electrode formed in a region of the projection portion of the second surface; a film-like piezoelectric body which has a uniform thickness and has a third surface disposed along the second surface of the elastic body and a fourth surface opposite to the third surface, and of which a shear modulus of elasticity is higher than that of the elastic body; a third electrode formed in a region of the
(Continued)

COMPARATIVE EXAMPLE fourth surface opposite to the first electrode; and a fourth electrode formed in a region of the fourth surface opposite to the second electrode.

15 Claims, 8 Drawing Sheets

(58) Field of Classification Search
USPC .......................................................... 73/774
See application file for complete search history.

(56) References Cited

U.S. PATENT DOCUMENTS

| | | | | |
|---|---|---|---|---|
| 5,195,046 | A * | 3/1993 | Gerardi | B64D 15/16 702/35 |
| 6,072,130 | A * | 6/2000 | Burgess | H01H 1/029 200/86 R |
| 9,953,205 | B1 * | 4/2018 | Rasmussen | G06K 9/0002 |
| 2006/0139393 | A1 * | 6/2006 | Zhang | B41J 2/17566 347/19 |
| 2008/0028855 | A1 * | 2/2008 | Kano | G01C 19/5698 73/504.12 |
| 2009/0293631 | A1 * | 12/2009 | Radivojevic | G01L 1/16 73/774 |
| 2010/0324839 | A1 | 12/2010 | Martin | |
| 2011/0146412 | A1 * | 6/2011 | Hoering | G01L 5/246 73/776 |
| 2015/0270475 | A1 * | 9/2015 | Isshiki | H01L 41/0815 310/360 |
| 2016/0252411 | A1 * | 9/2016 | Benaissa | H01L 41/1132 73/862.68 |
| 2016/0285430 | A1 * | 9/2016 | Kikuchi | H03H 3/08 |

FOREIGN PATENT DOCUMENTS

| | | |
|---|---|---|
| JP | 1-150829 A | 6/1989 |
| JP | 5-195869 A | 8/1993 |
| JP | 6-273396 A | 9/1994 |
| JP | 2010-519538 A | 6/2010 |
| JP | 2012-175016 A | 9/2012 |
| JP | 2016-90382 A | 5/2016 |

OTHER PUBLICATIONS

Japanese-language Written Opinion (PCT/ISA/237) issued in PCT Application No. PCT/JP2016/079725 dated Dec. 27, 2016 (four pages).

* cited by examiner

[Fig. 1]

UPPER SURFACE

A-A' SECTION

LOWER SURFACE

COMPARATIVE EXAMPLE

[Fig. 5B]

COMPARATIVE EXAMPLE

DEFORMATION DETECTING DEVICE AND DIAGNOSIS SYSTEM

TECHNICAL FIELD

The present disclosure relates to a deformation detecting device which monitors deformation of a measurement target, and a diagnosis system which diagnoses a state of the measurement target based on the detection result.

BACKGROUND ART

In an advanced information society where everything is connected to the network, such as IoE (Internet of Everything), a goal is to capture signs before an unexpected situation occurs and eventually maintain a normal state, by digitizing a state of everything into a numerical value from the health management of people or pets to the maintenance and management of production equipment or household appliances and preservation of the natural environment, and by analyzing the digitized value by a computer.

In order to realize the object, a system for monitoring the state of various items is an important element, and the development of a diagnosis system which uses various sensors (image sensors, vibration sensors, or the like) has proceeded. For example, in a production site or a production plant, transition to a diagnosis system for predicting the occurrence of a failure based on state monitoring data output from a sensor from a management method of the related art for periodically inspecting an operating pump, a compressor, or the like, is tested, and reduction of maintenance and management costs and deterrence of loss due to an unexpected failure, are expected.

In this type of diagnosis system, there are cases where maintenance and management are optimized by capturing signs of failures based on a difference between a numerical value of temperature or vibration state observed from a device which is a monitoring target and a numerical value in a normal state (for example, PTL 1).

CITATION LIST

Patent Literature

PTL 1: JP-T-2010-519538

SUMMARY OF INVENTION

Technical Problem

In facilities used in production sites, such as pumps, compressors, manufacturing devices, or analytical instruments, stable production is performed by maintaining predetermined performance by periodic maintenance inspections. However, in order to realize this, the costs increase and troubles, such as a failure, cannot be prevented, resulting in a loss, such as work delay.

In PTL 1, in order to predict deterioration of a pipeline structure, a vibration generator and a vibration sensor are mounted on a pipeline, and a deterioration state is diagnosed from the vibration response. However, specific consideration for the configuration of the sensor, installation place, installation method, and the like, is not described.

Solution to Problem

In order to solve the above-described problem, for example, a deformation detecting device having a configuration described in the claims is suggested. Here, the inventor of the present invention focuses attention on a point that the maximum potential difference appearing on a surface of a piezoelectric body by applying the same force can be made larger when the piezoelectric body is folded in a thickness direction than that when the piezoelectric body stretches in an in-plane direction, and suggests a deformation detecting device having a configuration to which the same principle can be applied. Specifically, the inventor of the present invention suggests a method of forming electrodes along an uneven pattern appearing on the surface of the piezoelectric body in a static state and increasing a signal appearing between the electrodes of which potential change characteristics match each other.

Specifically, there also has been suggested "a deformation detecting device including: (1) a film-like elastic body which has a first surface to be adhered to a measurement target and a second surface opposite to the first surface, and in which the second surface has at least one set of a recess portion and a projection portion in a first direction in a static state; (2) a first electrode formed in a region of the recess portion of the second surface; (3) a second electrode formed in a region of the projection portion of the second surface; (4) a film-like piezoelectric body which has a uniform thickness and has a third surface disposed along the second surface of the elastic body and a fourth surface opposite to the third surface, and of which a shear modulus of elasticity is higher than that of the elastic body; (5) a third electrode formed in a region of the fourth surface opposite to the first electrode; and (6) a fourth electrode formed in a region of the fourth surface opposite to the second electrode. In addition, the present inventor also suggests a diagnosis system using the above-described deformation detecting device".

Advantageous Effects of Invention

According to the present disclosure, it is possible to detect the deformation (expansion and contraction) of the measurement target regardless of the installation place or the installation method of the deformation detecting device. The problems, configurations, and effects other than those described above will be clarified by the following description of the embodiments.

DESCRIPTION OF EMBODIMENTS

Examples of the present disclosure will be described hereinafter with reference to the drawings. Partial deletion, mutual substitution, and combination can be made in each of the Examples which will be described later. The present disclosure will not be interpreted as being limited to the Examples which will be described later.

(1) Term

First, the terms used in the present specification will be described.

The measurement target is used in a broad meaning including not only production equipment incorporating pumps or compressors but also analysis devices, structures, and the like. For example, the measurement target includes not only devices and structures, but also human bodies and other animals. In addition, specific examples will be described later.

The position where the deformation detecting device is adhered to the measurement target includes, for example, a part for introducing cooling water from a central piping system to the device, and a rubber pipe used in the device.

The piezoelectric body is formed of a material having a higher shear modulus of elasticity than that of the elastic body to be adhered to the measurement target. For the piezoelectric body, for example, a piezoelectric film, a gel film, or a sputtered film is used. In Example which will be described later, an organic piezoelectric sheet is used.

The elastic body is formed of a material having rubber elasticity (so-called rubber elastic body). In the Examples which will be described later, a rubber elastic sheet (a sheet made of silicone rubber) is used.

The deformation detecting device considers deformation in the same inward direction as an adhering surface to the measurement target, as a main detection target. In addition, it is preferable that the adhering surface is apart at which a change in vibration characteristics accompanying a state change of the device tends to appear, or a part at which it is easy to measure the heartbeat of a human being or an animal.

A static state is a state where the measurement target is not deformed in a plane direction, that is, a state where no load is applied to the measurement target (or elastic body) in the plane direction.

An expression "at the time of deformation" means a state where the measurement target is deformed in the plane direction by the load applied in the plane direction.

An uneven pattern (recess portion and projection portion) appearing in the static state is not necessarily required to be continuously disposed in the longitudinal direction, and the recess portion and the projection portion which configure the uneven pattern may be disposed at a predetermined interval or a predetermined distance away from each other. The constant interval or the predetermined distance is determined in accordance with the position where the deformation to be detected appears significantly.

(2) Example 1

(2-1) Overall Configuration

Figure 1:
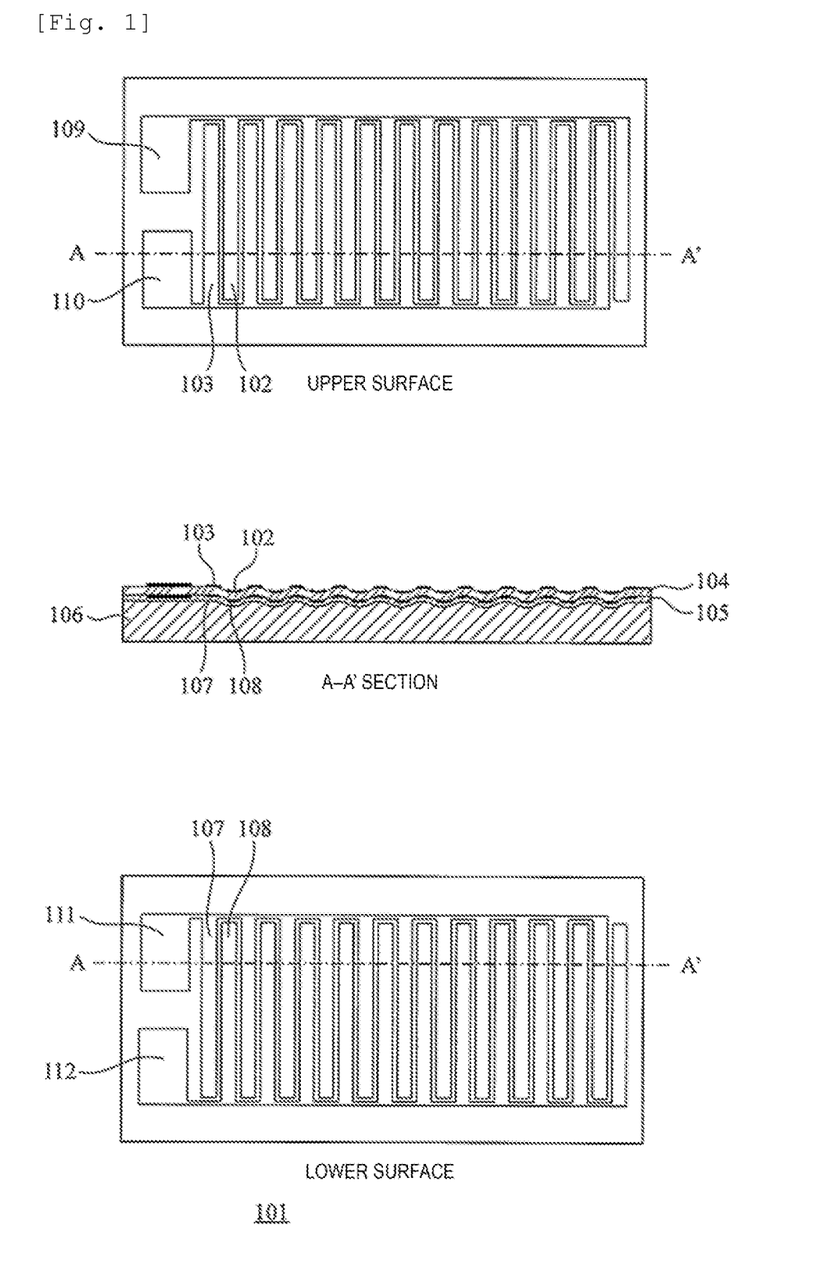
FIG. 1 is a view illustrating a sectional configuration of a detecting device according to Example 1 and an electrode structure on upper and lower surfaces of a piezoelectric body which configures the detecting device.

FIG. 1 illustrates a sectional structure of a detecting device 101 which configures a deformation detecting device according to the Example and an electrode structure on upper and lower surfaces of a piezoelectric body which configures the detecting device. As illustrated in a sectional view (A-A' section), the detecting device 101 has a structure in which a rubber elastic sheet 106, an adhesive layer (bonding layer) 105, an electrode 107 and an electrode 108, an organic piezoelectric sheet 104, an electrode 102 and an electrode 103, and a protective film (reinforcing material) (not illustrated) are stacked, in an order from a lower surface side to be adhered to the measurement target. In other words, the rubber elastic sheet 106 is on the bottom surface side and the organic piezoelectric sheet 104 is on the upper surface side. An amount of extension of the organic piezoelectric sheet 104 in the longitudinal direction is restricted by the protective film, and disconnection of the electrodes 102, 103, 107, and 108 can be suppressed regardless of the material of the organic piezoelectric sheet 104.

Both the organic piezoelectric sheet 104 and the rubber elastic sheet 106 are film-like members having a uniform thickness. The organic piezoelectric sheet 104 and the rubber elastic sheet 106 are adhered to each other via the adhesive layer 105 on an interface therebetween. Therefore, the organic piezoelectric sheet 104 has a sectional shape similar to a surface shape appearing on the upper surface (the second surface in the claims) of the rubber elastic sheet 106 which configures the base. As illustrated in a sectional view (A-A' section), on the upper surface of the rubber elastic sheet 106, in the static state, a structure in which the recess portion and the projection portion are continuously repeated in a long side direction of the rubber elastic sheet 106 (uneven pattern) is formed. In addition, the film thickness of the rubber elastic sheet 106 in a short side direction is the same. Therefore, in the static state, the organic piezoelectric sheet 104 adopts the uneven pattern (so-called corrugated plate pattern) in which the recess portions and the projection portions are alternately arranged in a line in the longitudinal direction of the rubber elastic sheet 106. A height H of the recess portion and the projection portion appearing in the organic piezoelectric sheet 104 decreases due to elastic deformation when the rubber elastic sheet 106 expands (stretches) in the in-plane direction, and, on the contrary, the height H increases due to elastic deformation when the rubber elastic sheet 106 contracts (is compressed).

Any of the electrodes 102 and 103 formed on the upper surface side of the organic piezoelectric sheet 104 has a shape of comb teeth and has a plurality of electrodes having a shape of comb teeth configuring the electrode 102 and a plurality of electrodes having a shape of comb teeth configuring the electrode 103 which are alternately arranged with a gap therebetween (that is, in a shape of a nest). The detecting device 101 considers the deformation of the measurement target in an arrangement direction of the shape of comb teeth as the detection target. Here, the surface side of the organic piezoelectric sheet 104 corresponds to the fourth surface in the claims. In addition, the electrode 102 corresponds to the fourth electrode in the claims, and the electrode 103 corresponds to the third electrode in the claims.

The electrodes 107 and 108 formed on the lower surface side of the organic piezoelectric sheet 104 has a shape of comb teeth and has a plurality of electrodes having a shape of comb teeth configuring the electrode 107 and a plurality of electrodes having a shape of comb teeth configuring the electrode 108 which are alternately arranged with a gap therebetween (that is, in a shape of a nest). The detecting device 101 considers the deformation of the measurement target in an arrangement direction of the shape of comb teeth as the detection target. Here, the lower surface side of the organic piezoelectric sheet 104 corresponds to the third surface in the claims. In addition, the electrode 107 corresponds to the second electrode in the claims, and the electrode 108 corresponds to the first electrode in the claims.

The electrode 103 and the electrode 107 are formed at positions facing each other with the organic piezoelectric sheet 104 interposed therebetween, and the electrode 102 and the electrode 108 are formed at positions facing each other with the organic piezoelectric sheet 104 interposed therebetween. In a case of FIG. 1, the electrode 103 and the electrode 107 are formed in a region of the projection portion of the organic piezoelectric sheet 104, and the electrode 102 and the electrode 108 are formed in a region of the recess portion of the organic piezoelectric sheet 104. The four electrodes are electrically separated (insulated) by the organic piezoelectric sheet 104 or a gap between adjacent electrodes in the same plane. In addition, an extraction electrode pad 109 is connected to one end of the electrode 102, an extraction electrode pad 110 is connected to one end of the electrode 103, an extraction electrode pad 111 is connected to one end of the electrode 107, an extraction electrode pad 112 is connected to one end of the electrode 108.

Figure 2:
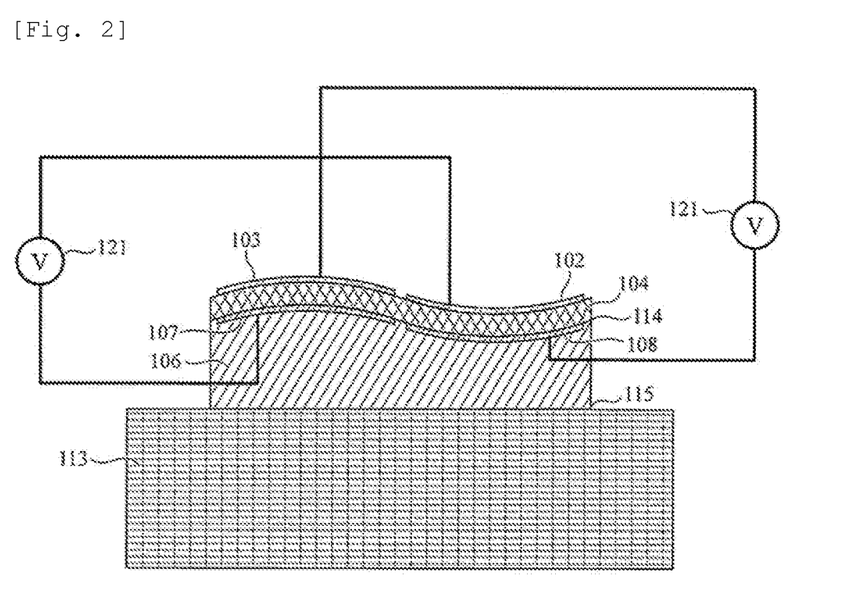
FIG. 2 is a view describing a connection structure between electrodes of the detecting device according to Example 1.

In a case of the Example, as illustrated in FIG. 2, the extraction electrode pads corresponding to an electrode pair (electrode 103 and electrode 108, and electrode 102 and electrode 107) positioned in a diagonal direction are connected to each other by wiring, and a current that flows between the electrodes or a voltage generated between the electrodes can be measured. FIG. 2 illustrates an example in which two voltmeters 121 are arranged. In addition, the current or voltage to be measured is not necessarily a value that corresponds to two electrode pairs as illustrated in the example of FIG. 2, and only a value that corresponds to one electrode pair may be used. The reason for using such wiring will be clarified by the description below.

In addition, the organic piezoelectric sheet 104 used in the Example includes at least one of polyvinylidene fluoride, a vinylidene fluoride-tetrafluoroethylene copolymer, and a vinylidene fluoride-trifluoroethylene copolymer, and a piezoelectric material having a shear modulus of elasticity G of approximately 0.3 to 4 [GPa] can be arbitrarily adopted. In addition, the rubber elastic sheet 106 is manufactured by using a material, such as silicone rubber that is easy to be finely molded and by selecting a hardness that corresponds to a measurement target 113. Further, the shear modulus of elasticity G of the rubber elastic sheet 106 is necessarily to be smaller than that of the organic piezoelectric sheet 104.

(2-2) Configuration of Minimum Unit

Figure 3A:
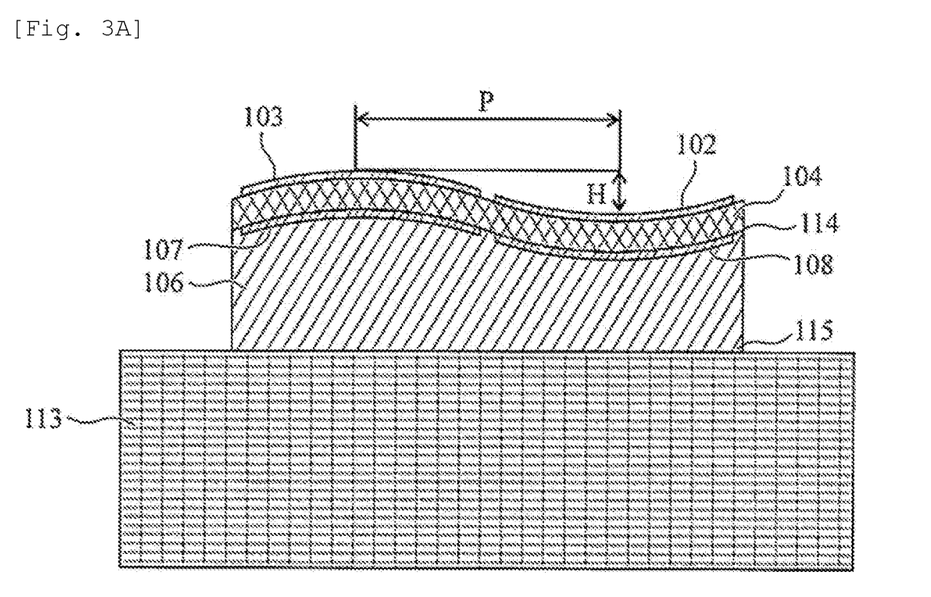
FIG. 3A is a view illustrating a sectional shape of a minimum unit structure before a load is applied to the detecting device according to Example 1.
Figure 3B:
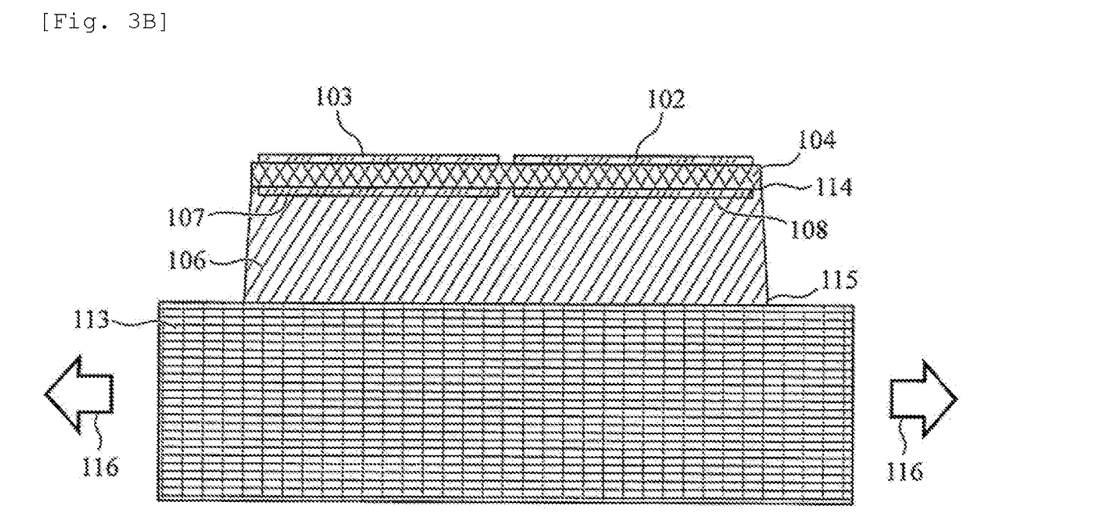
FIG. 3B is a view illustrating a sectional shape of a minimum unit structure after a load is applied to the detecting device according to Example 1.

FIGS. 3A and 3B describe a configuration of a minimum unit of the detecting device 101. The uneven pattern that corresponds to the minimum unit is given by one recess portion and one projection portion. FIG. 3A illustrates a shape in a static state (a state where no load is applied to the detecting device 101) as in FIG. 1, and FIG. 3B illustrates a shape at a time of deformation of the measurement target (when a load is applied in the long side direction of the deformation detecting device 101 and the rubber elastic sheet 106 elongates).

When the detecting device 101 is adhered to the measurement target 113, a current proportional to the expansion and contraction speed of the surface flows between the electrode 103 and the electrode 108 and between the electrode 102 and the electrode 107. Therefore, it is possible to detect the expansion and contraction speed (≈change rate of force) of the measurement target 113 from the currents of the two systems.

Figure 4A:
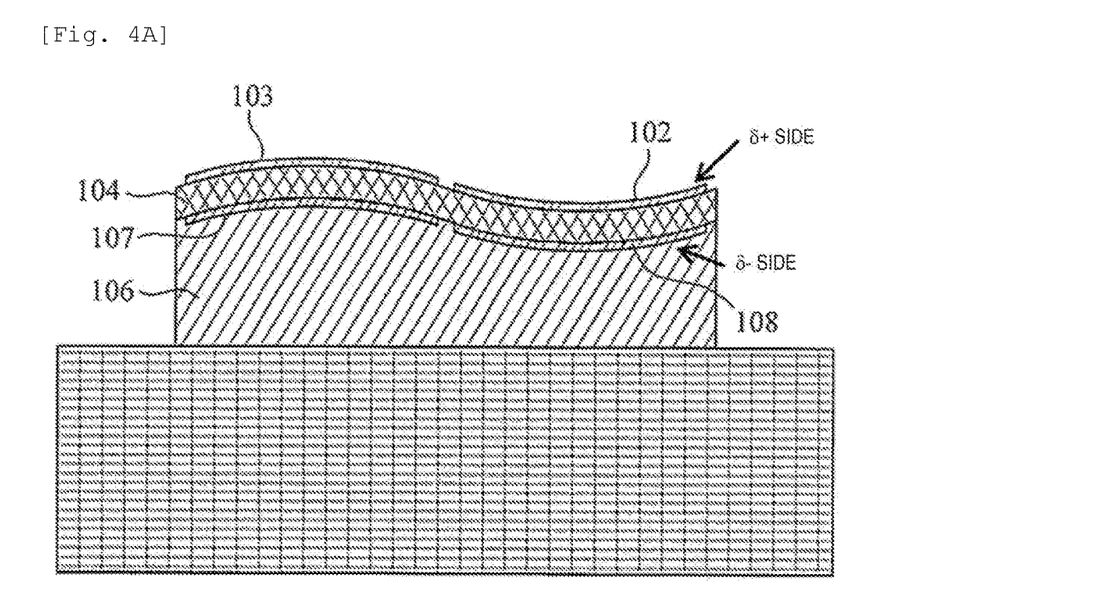
FIG. 4A is a view describing a potential relationship before a load is applied to the detecting device according to Example 1.

As illustrated in FIG. 3A, in a state where no load is applied, a tensile stress caused by bending (projected shape) acts on the surface of the organic piezoelectric sheet 104 positioned immediately below the electrode 103 and immediately below the electrode 108. Further, a compressive stress caused by bending (recessed shape) acts on the surface of the organic piezoelectric sheet 104 positioned immediately below the electrode 102 and immediately below the electrode 107. Hereinafter, the direction of polarization generated in the organic piezoelectric sheet 104 by the stresses is defined as illustrated in FIG. 4A. In other words, in the organic piezoelectric sheet 104, the rubber elastic sheet 106 side is set to a negative charge ($\delta-$) side and an opposite side thereof is set to a positive charge ($\delta+$) side.

In FIG. 4A (static state), the positive charge ($\delta+$) immediately below the electrode 103 on which the tensile stress acts and the negative charge ($\delta-$) immediately below the electrode 108 increase more than that in a state without stress, and the positive charge ($\delta+$) immediately below the electrode 102 on which the compressive stress acts and the negative charge ($\delta-$) immediately below the electrode 107 decrease more than the state without stress.

From this state, in a case where a force 116 for stretching the rubber elastic sheet 106 in the longitudinal direction acts on the measurement target 113 (that is, in a case of FIG. 4B), the charge ($\delta$) immediately below each electrode returns to the original charge $\delta$ of the related art. In other words, the charge ($\delta$) increases and decreases in a direction reverse to the above-described direction of increasing or decreasing the charge ($\delta$).

Figure 4B:
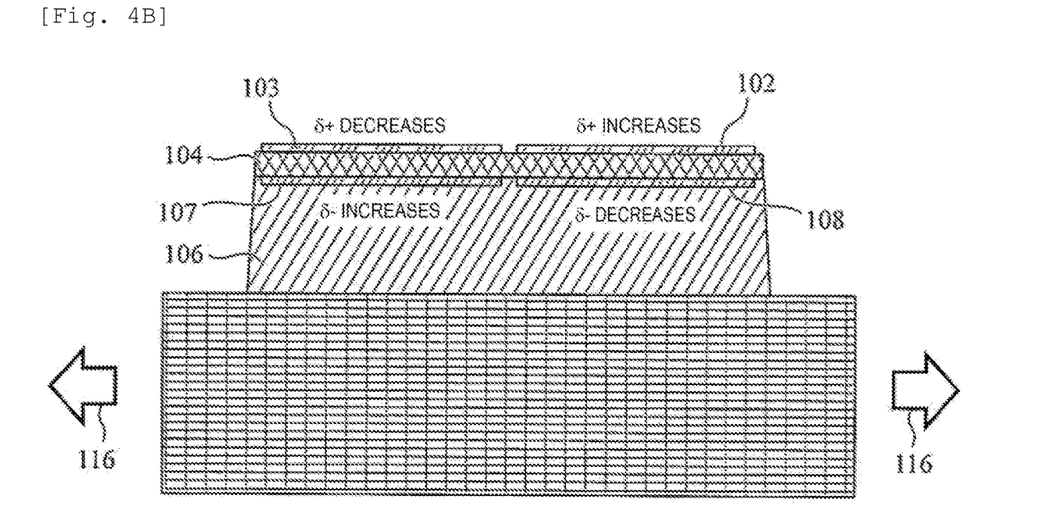
FIG. 4B is a view describing a potential relationship after a load is applied to the detecting device according to Example 1.

For example, as illustrated in FIG. 4B, both the positive charge ($\delta+$) immediately below the electrode 103 and the negative charge ($\delta-$) immediately below the electrode 108 change in a decreasing direction. At this time, electrons flow from the electrode 103 to the electrode 108 through the wiring illustrated in FIG. 2 so as to maintain the balance of electric charge, and a voltage is generated at both ends of the resistance configuring the voltmeter 121. Meanwhile, both the positive charge ($\delta+$) immediately below the electrode 102 and the negative charge ($\delta-$) immediately below the electrode 107 change in an increasing direction. At this time, electrons flow from the electrode 107 to the electrode 102 through the wiring illustrated in FIG. 2 so as to maintain the balance of electric charge, and a voltage is generated at both ends of the resistance configuring the voltmeter 121.

The detecting device 101 in the present Example outputs an addition result (integrated value) of the potentials generated due to the flow of the electrons of the two systems as the expansion and contraction speed (≈change rate of force) signal of the measurement target 113. In addition, the output aspect is merely an example, and only one potential of the two systems may be output as the expansion and contraction speed signal.

(2-3) Technical Effects by Rubber Elastic Sheet 106

Technical effects of the rubber elastic sheet 106 will be described here. First, a case where the rubber elastic sheet 106 does not exist will be investigated. In a case where the measurement target 113 to which the detecting device 101 is adhered is substantially deformed, when the rubber elastic sheet 106 does not exist, a large force acts on an interface 115 between the electrodes 102, 103, 107, and 108 formed on the surface of the organic piezoelectric sheet 104 or the organic piezoelectric sheet 104 and the measurement target 113.

In order to avoid this situation, in the Example, the rubber elastic sheet 106 is disposed between the organic piezoelectric sheet 104 and the measurement target 113. In the Example, while the shear modulus of elasticity G of the organic piezoelectric sheet 104 is approximately 4 [GPa], the shear modulus of elasticity G of the rubber elastic sheet 106 is equal to or less than 0.04 [GPa]. It is needless to say that the numerical values are only examples. In this manner, since the shear modulus of elasticity G of the rubber elastic sheet 106 is equal to or less than $\frac{1}{100}$ of the shear modulus of elasticity G of the organic piezoelectric sheet 104, even when the measurement target 113 is substantially deformed, a stress generated in the rubber elastic sheet 106 can be smaller than that in a case where the organic piezoelectric sheet 104 is directly adhered to the measurement target 113.

Further, for example, a case where the uneven pattern which is continuous in the longitudinal direction is not formed on the upper surface of the rubber elastic sheet 106, will be investigated. In this case, even when the measurement target 113 shows 1% elongation, the distortion transmitted to the organic piezoelectric sheet 104 is less than 0.01%. Accordingly, it is possible to prevent large distortion from being applied to the four electrodes formed on the surface of the organic piezoelectric sheet 104. However, a case of being able to reduce the propagation of stress applied to the interface of adherence means that the input to the detecting device 101 also becomes smaller.

In order to solve this technical problem, in the Example, the uneven pattern continuous in the longitudinal direction is formed on the upper surface side of the rubber elastic sheet 106, while suppressing the load on the electrodes and the interface of adherence on the surface of the organic piezoelectric sheet 104, at the same time, the distortion applied to the organic piezoelectric sheet 104 increases. Due to the uneven pattern (pitch P and height H), initial distortion that corresponds to the above-described stress is generated on both surfaces of the organic piezoelectric sheet 104 in the static state, the size of the distortion changes to zero along with the elongation of the measurement target 113 (in the process in which organic piezoelectric sheet 104 returns to a flat state), and the magnitude of the strain changes to zero, and the change is measured by the voltmeter 121 as the expansion and contraction speed signal.

For example, in a case where the wave height H is 0.04 [mm] and the thickness of the rubber elastic sheet 106 is 0.1 [mm] when the pitch P of the uneven pattern is 1 [mm], the initial distortion becomes ±0.16%, and the measurement target 113 elongates by 1%, and in this case, the magnitude of distortion on both surfaces of the organic piezoelectric sheet 104 becomes zero. At this time, the organic piezoelectric sheet 104 returns to the original flat state. In a case where the sizes of the organic piezoelectric sheets 104 are equalized, the change in distortion at this time is 16 times or more as compared with a case where the uneven pattern does not exist, and this causes an improvement in the sensitivity of the sensor. When designing the sensor, the rigidity ratio (hardness 10 to 70) of the rubber elastic sheet 106 and the pitch P and wave height H of the uneven pattern are determined from the maximum elongation percentage of the measurement target 113, and the distortion applied to the electrode becomes equal to or less than 0.2% while designing such that a force for flattening the organic piezoelectric sheet 104 is applied in a case where the maximum elongation rate is achieved.

(2-4) Comparative Example

Figure 5A:
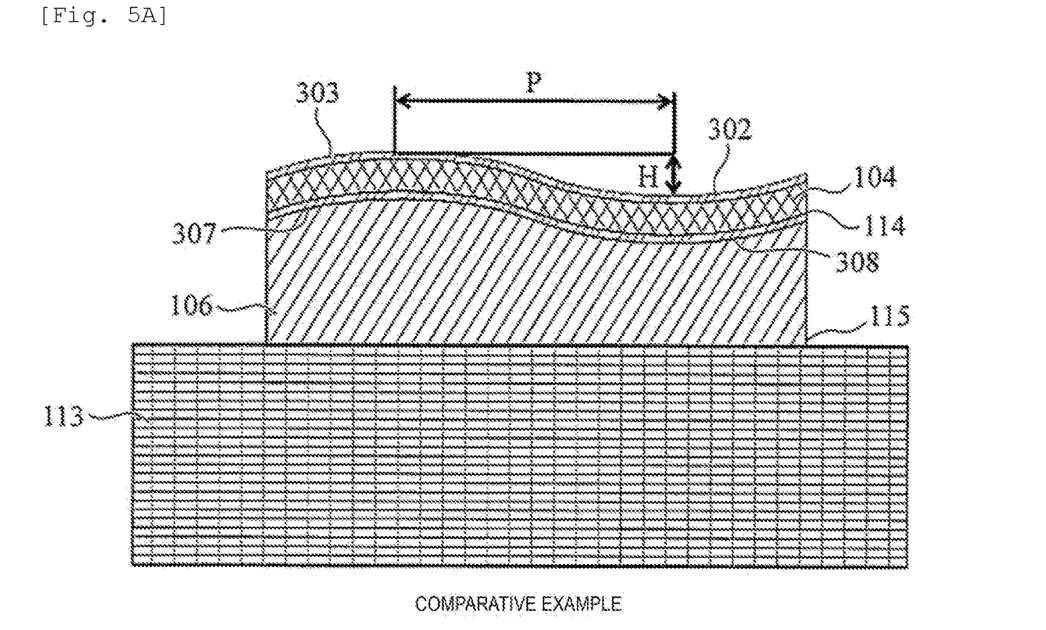
FIG. 5A is a view illustrating a sectional shape of a minimum unit structure before a load is applied to a detecting device according to a comparative example.
Figure 5B:
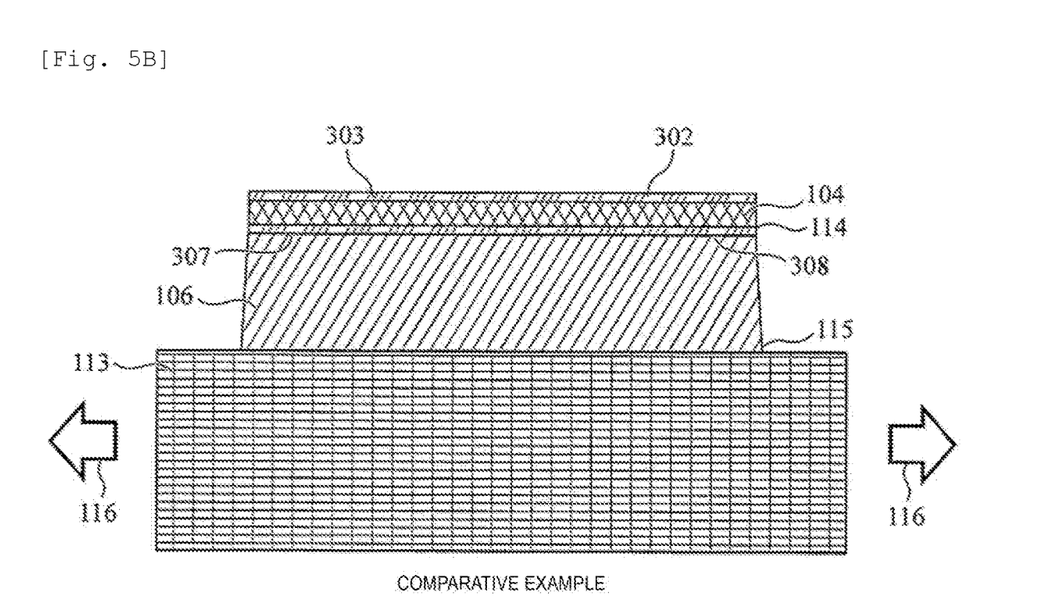
FIG. 5B is a view illustrating a sectional shape of a minimum unit structure after a load is applied to the detecting device according to a comparative example.

As a comparative example, a case where a full-scale electrode is disposed on the upper surface and the lower surface of the organic piezoelectric sheet 104. FIG. 5A illustrates a shape of a minimum unit configuration in a static state (a state where no load is applied), and FIG. 5B illustrates a shape of a minimum unit configuration in a state where a load is applied in the longitudinal direction of the measurement target 113 and elongates. In the example, since this is a case of full-scale electrode, an electrode 302 positioned in the recess portion on the upper surface side and an electrode 303 positioned in the projection portion are electrically conducted with each other, and an electrode 307 positioned in the recess portion on the lower surface side and an electrode 308 positioned in the projection portion are electrically conducted with each other. Here, the part that corresponds to the recess portion of the full-scale electrode disposed on the upper surface side is referred to as the electrode 302, and the part that corresponds to the projection portion is referred to as the electrode 303. Similarly, the part that corresponds to the recess portion of the full-scale electrode disposed on the upper surface side is referred to as the electrode 307, and the part that corresponds to the projection portion is referred to as the electrode 308.

In the static state, the tensile stress caused by bending acts on the surface of the organic piezoelectric sheet 104 immediately below the electrode 303 positioned in the projection portion, and a compressive stress acts on the surface of the organic piezoelectric sheet 104 immediately below the electrode 302 positioned in the recess portion. Therefore, while the positive charge (δ+) of the region where the tensile stress acts increases more than that in the state without stress, the positive charge (δ+) of the region where the compressive stress acts decreases, but since the electrodes are electrically conducted with each other, an increase and decrease in positive charge (δ+) generated in each electrode is canceled out. Similarly, the tensile stress caused by bending acts on the surface of the organic piezoelectric sheet 104 immediately below the electrode 307 positioned in the recess portion, and a compressive stress caused by bending acts on the surface of the organic piezoelectric sheet 104 immediately below the electrode 308 positioned in the projection portion. Therefore, while the negative charge (δ−) of the region where the tensile stress acts increases more than that in the state without stress, the negative charge (δ−) of the region where the tensile stress acts decreases, but since the electrodes are electrically conducted with each other, an increase and decrease in negative charge (δ−) generated in each electrode is canceled out.

Therefore, the change in electric charge δ immediately below each electrode when the force 116 acts on the measurement target 113 from the static state to shift to the state where the detecting device 101 elongates in the longitudinal direction, is canceled out. However, since an increase and decrease amount of the electric charge δ with respect to the stress is different between the tensile stress and the compressive stress, a signal which is approximately one tenth that in a case where the electrode configuration of the Example is provided can be obtained.

(2-5) Effects

According to the Example, it is possible to perform stable measurement with no change over time in the mounted state of the detecting device 101. In addition, by using the organic piezoelectric sheet 104 as the detecting device 101, it is possible to measure a site or the like at which it has been difficult to install the detecting device 101. For example, the detecting device 101 is adhered to a part at which a change in vibration characteristic accompanying a change in state of the device is likely to appear, a precursor phenomenon that leads to a dangerous state is detected by continuously analyzing data collected (in real time), and it is possible to prevent the loss caused by the interruption or the like of production due to the failure or the like of the device by performing preventive measures. In addition, the detecting device 101 is adhered to a part of a human body at which it is easy to measure the heartbeat of a person, and it is possible to prevent health problems and the like caused by an excessive load. Further, by adhering the organic piezoelectric sheet 104 to the upper surface of the rubber elastic sheet 106 on which the uneven pattern is formed, it is possible to detect a signal obtained by multiplying the change of the measurement target 113 by several times as compared with other detecting devices which do not have the uneven pattern.

(3) Example 2

Figure 6:
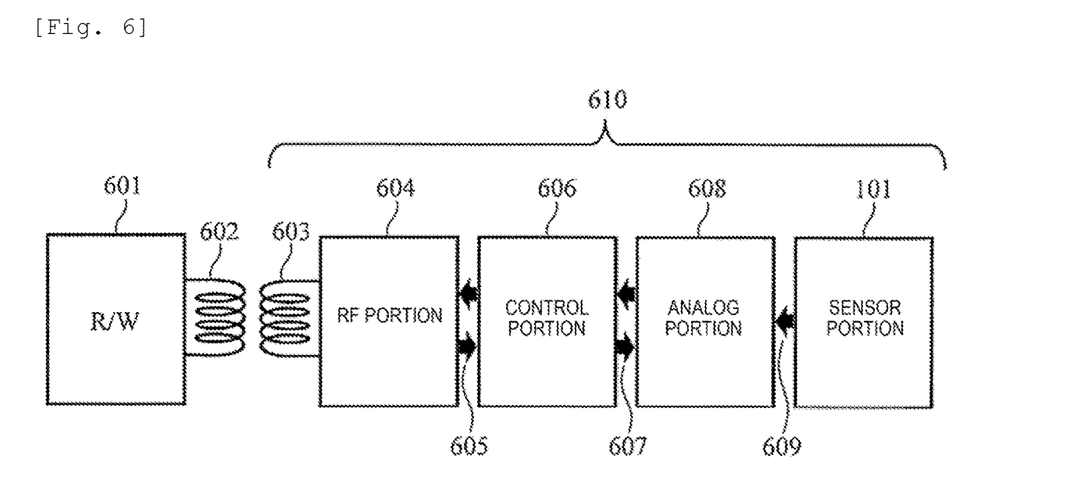
FIG. 6 is a view describing a circuit configuration of a deformation detecting device according to Example 2.

FIG. 6 illustrates a circuit configuration of a deformation detecting device 610 which wirelessly takes out a signal 609 from the detecting device 101 (sensor portion) to an external device (external reader (R/W) portion 601). However, a method of taking out the signal 609 from the detecting device 101 (sensor portion) to the external device is affected by the reliability and costs of the system. Therefore, the signal 609 can also be taken out to the external device by the wired communication method. In this case, a wired communication portion is used instead of an RF portion 604 which will be described later. An advantage of taking out the signal 609 to the external device by the wireless communication method is that it may not be necessary to connect the wiring to the measurement target 113. Further, in a case of the wireless communication method, it is possible to avoid disconnection due to a load applied to the wiring connection portion by moving the measurement target 113, to save time and labor for wiring the wiring, to reduce the installation costs, and to improve a degree of freedom of the adherence place.

The deformation detecting device 610 is configured with the detecting device 101 (FIG. 1) that serves as a sensor portion; an analog portion 608 which cuts a noise component from the analog signal 609 (a signal appearing between the electrode pairs positioned in the diagonal direction) output from the inspection device 101, takes out only the vibration signal of the measurement target 113, and amplifies the vibration signal; a control portion 606 which digitizes the vibration signal 607 processed by the analog portion 608 into numerical values at each sampling time and converts the numerical value into a binary number; and the radio frequency (RF) portion 604 which converts a binary number (binary data) 605 received from the control portion 606 according to a communication standard and transmits the converted number from the antenna 603. The binary number here corresponds to detection data in the scope of claims. In addition, the voltmeter 121 may be mounted on the sensor portion 101 or may be included in the analog portion 608.

The antenna 603 of the RF portion 604 also plays a role of receiving power output from an antenna 602 of the external reader (R/W) portion 601. The RF portion 604 operates with the received power and also supplies the power to the control portion 606 and the analog portion 608. In the circuit configuration, a voltage proportional to the expansion and contraction speed (≈change rate of force) of the surface of the measurement target 113 is output as a binary number, but a voltage proportional to the expansion and contraction amount (≈force) can also be output by adding a charge amplifier function to somewhere of a data processing system after the analog portion 608.

Figure 7:
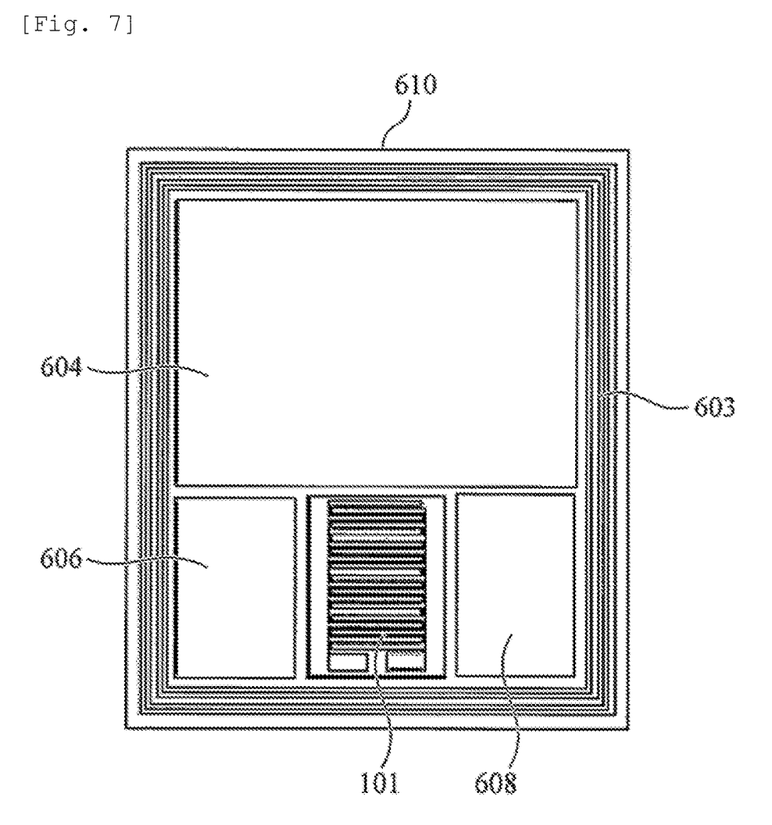
FIG. 7 is a view describing a plane configuration of the deformation detecting device according to Example 2.

FIG. 7 illustrates an example of a plan configuration in a case where the deformation detecting device 610 which uses the wireless communication method for communication with the outside is formed on a rectangular rubber elastic sheet 106. In other words, a configuration example in a case where the detecting device 101 (FIG. 1) that serves as a sensor portion, the analog portion 608, the control portion 606, the RF portion 604, and the antenna 603 are all mounted on the rubber elastic sheet 106, is illustrated. In addition, on the upper surface of the rubber elastic sheet 106, the uneven pattern is formed only in the region where the detecting device 101 (FIG. 1) that serves as a sensor portion is disposed, and the other region part is formed to be flat. The analog portion 608, the control portion 606, and the RF portion 604 are adhered to the flat surface.

The organic piezoelectric sheet 104 having a total of four electrodes having a shape of comb teeth formed on each of the upper surface and the lower surface is adhered to the region where the uneven pattern is formed. Each of circuits of the analog circuit 608, the control portion 606, and the RF portion 604 formed on the silicon substrate by using a semiconductor manufacturing technology are adhered to the other regions. In a case where the surface of the measurement target 113 is a curved surface, silicon on which the circuit is formed is thinned so as to be adhered along the curved surface.

In addition, a circuit may be formed on a resin sheet by using a printing technology using a manufacturing technology of an organic semiconductor. For example, unless the organic piezoelectric sheet 104 is also subjected to polarization treatment, a resin sheet having no piezoelectricity is achieved. Here, it is possible to perform polarization treatment only in the region where the detecting device 101 is disposed, and to form the circuit in the other region having no piezoelectricity by printing.

Figure 8:
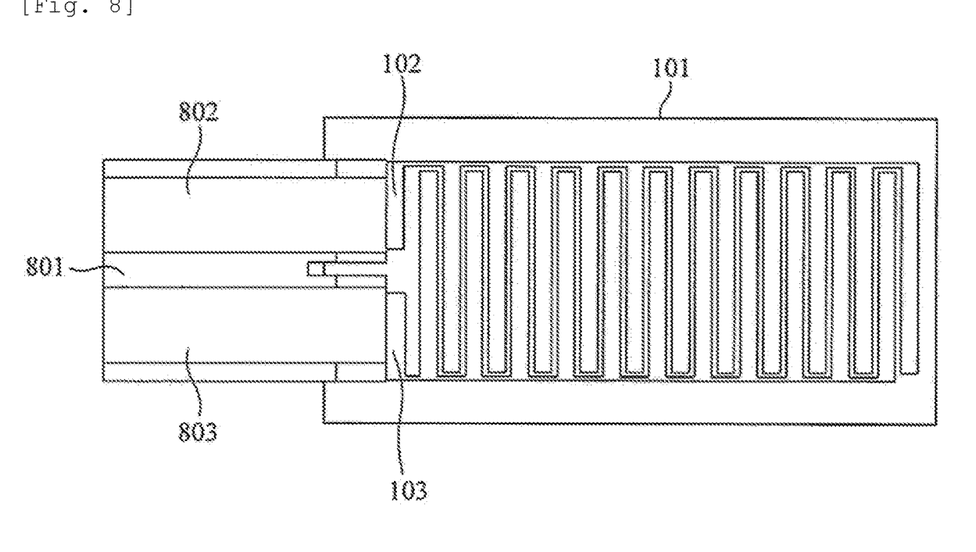
FIG. 8 is a view describing a connection part of a detecting device in the deformation detecting device according to Example 2.

Further, only the detecting device 101 may be disposed on the rubber elastic sheet 106, and the analog portion 608, the control portion 606, the RF portion 604, and the antenna 603 may be mounted on an electronic circuit board. In this manner, in a case where the detecting device 101 and the electronic circuit board are formed on separate bases, the detecting device 101 and the electronic circuit board may be connected to each other via a flexible wiring 801 as illustrated in FIG. 8. When lengthening the wiring length of the flexible wiring 801, the detecting device 101 is adhered to the curved surface portion, while it is possible to adhere the electronic circuit board to the flat portion separated from the curved surface portion, and to improve the degree of freedom of use.

In this case, the detecting device 101 and the flexible wiring 801 are connected to each other not by wire bonding but by surface contact. Specifically, the extraction electrode pad 109 (for the electrode 102) and the extraction electrode pad 110 (for the electrode 103) which are provided on the upper surface side of the detecting device 101 are electrically connected to an electrode 802 and an electrode 803 on the flexible wiring 801 side by surface contact using low melting point solder, anisotropic conductive sheet, Ag paste or the like. Further, the extraction electrode pad 111 (for the electrode 107) and the extraction electrode pad 112 (for the electrode 108) which are provided on the lower surface side of the detecting device 101 are electrically connected to two electrodes (not illustrated) on the flexible wiring 801 side by the same method.

Since the piezoelectric properties of the organic piezoelectric sheet 104 deteriorate at a relatively low temperature of approximately 80° C., in a case where polarization treatment cannot be performed after wiring connection, by using room temperature curing type Ag paste or the like, the organic piezoelectric sheet 104 is electrically connected at an allowable temperature or less. In addition, when the organic piezoelectric sheet 104 is used in connection with the electronic circuit board, a part to be a scaffold for attaching the electronic circuit board is required for the measurement target 113. However, as described above, by lengthening the wiring length of the flexible wiring 801, the installation position of the deformation detecting device 610 using a wireless manner and the electronic circuit board are separated from each other, and thus, it is possible to solve the inconvenience.

(4) Example 3

Figure 9:
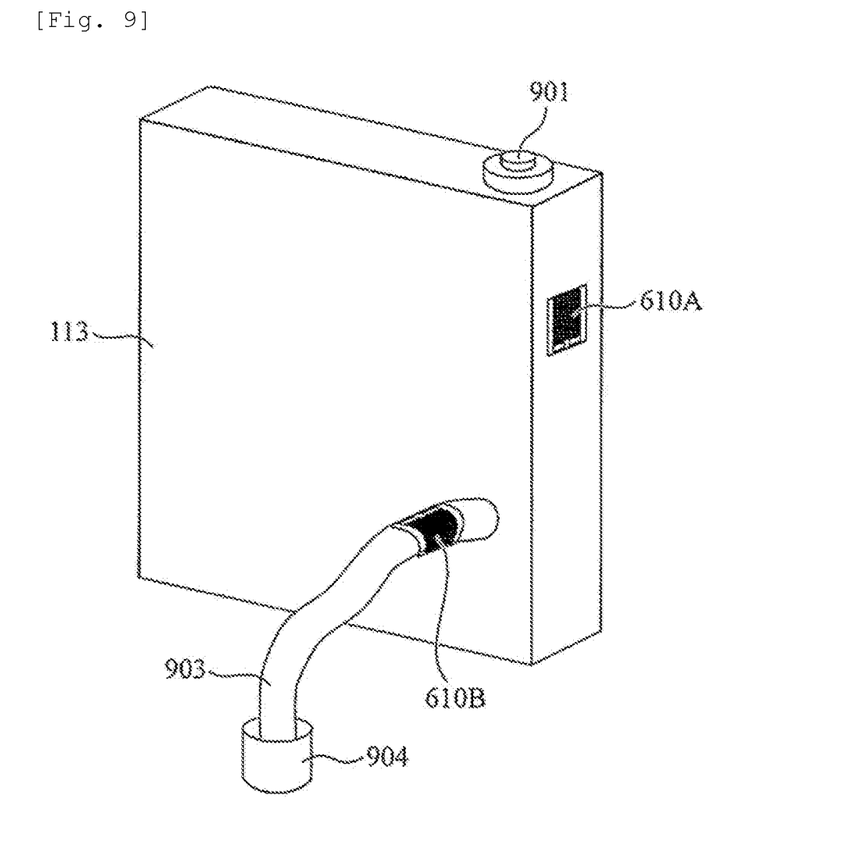
FIG. 9 is a view describing an attachment example of a deformation detecting device in a diagnosis system according to Example 3.

FIG. 9 illustrates an example of mounting of deformation detecting devices 610A and 610B onto the device that serves as the measurement target 113. It is needless to say that the deformation detecting devices 610A and 610B communicate with an external device by a wireless communication method. In FIG. 9, while the deformation detecting device 610A is adhered to the device cover (housing), the deformation detecting device 610B is adhered to a pipe 903 through which the waste liquid flows. In addition, the drainage is discharged through the pipe 903 to a drain hole 904. Accordingly, the deformation detecting devices 610A and 610B can measure the vibration of each portion when the device that serves as the measurement target 113 is operating.

The deformation detecting device 610A adhered to the device cover is adhered for the purpose of monitoring whether or not the vibration of the measurement target 113 is in a state different from a normal state, and the deformation detecting device 610B adhered to the pipe 903 is adhered for the purpose of monitoring whether or not the abnormality has occurred in the drainage system from the vibration state of the pipe 903 or whether or not the pipe 903 has wandered and jumped out from the drain hole 904. In a case of this example, the signals which are wirelessly transmitted from each of the deformation detecting devices 610A and 610B are collected by a repeater 901 and then transferred to a central management device (not illustrated). A diagnosis system is configured with the deformation detecting devices 610A and 610B here and the central management device. Monitoring of the state of the measurement target 113 based on the detection data is performed by the central management device.

In a case of the diagnosis system, when it is not possible to distinguish the received detection data from which of the deformation detecting devices 610A and 610B the data has been sent, the state of the measurement target 113 cannot be diagnosed. Therefore, a tag signal indicating the attachment place or the device ID of the deformation detecting devices 610A and 610B is given to each piece of data by the signal processing system of any of the analog portion 608, the control portion 606, and the RF portion 604. In addition, in a case of giving the device ID, it is necessary for the central management device or the like to store table information in which correspondence relationship with the attachment position is recorded.

In addition, in FIG. 9, the pipe 903 through which the drainage flows is set as the measurement target 113, but the cooling water may be monitored in the same manner. For example, when air bubbles are mixed in the cooling water, not only the original cooling performance cannot be obtained, but also the inertia force applied to the pipe 903 from the fluid changes due to the presence of bubbles changes, and thus, the vibration of the pipe 903 increases, and the deterioration of the pipe 903 is accelerated. Therefore, it is important to monitor that the cooling water is in a stable state where air bubbles are not mixed therein, and it is significant to adhere the deformation detecting device 610 to the pipe 903. In addition, rubber pipe that is easy to bend is often used at a part that pulls cooling water from the central piping into individual devices or on the inside of the device, and not only is distortion of several % applied to the bent rubber pipe surface, even when there is no defect in the cooling system, such as air bubbles adhered to the inside of the cooling system flowing through the rubber pipe during the device is stopped at the start of the flow of the cooling water, such as at the time of starting up the device, a large distortion is often applied to the deformation detecting device 610 adhered thereto. Therefore, the deformation detecting device 610 which can be used at a part at which the rubber pipe is used, such as a piping system for introducing the cooling water to the device or a piping system on the inside of the device, is extremely useful.

Further, the deformation detecting device 610 can be used for applications other than those used for monitoring the device. For example, the deformation detecting device 610 can also be used for measuring the load applied to the human body by being adhered to the skin. Since a large distortion is applied to the deformation detecting device 610 adhered to the skin having high stretching properties, the deformation detecting device 610 is useful for measuring the load. The measurement target in this case becomes human vital data, but data, such as heartbeat or respiration, are particularly suitable for estimating the stress that the person feels, and take the heartbeat signal continuously for 24 hours, and accordingly, it is possible to improve the living by analyzing in what kind of environment the stress is felt, or the like. In addition, by being adhered to a joint, such as a knee or an elbow, and by giving data of the deformation detecting device 610 which uses a wireless manner to the data of an activity meter or the like which uses an acceleration sensor of the related art, more detailed momentum data can be obtained, and it is possible to improve the quality of life management.

Figure 10:
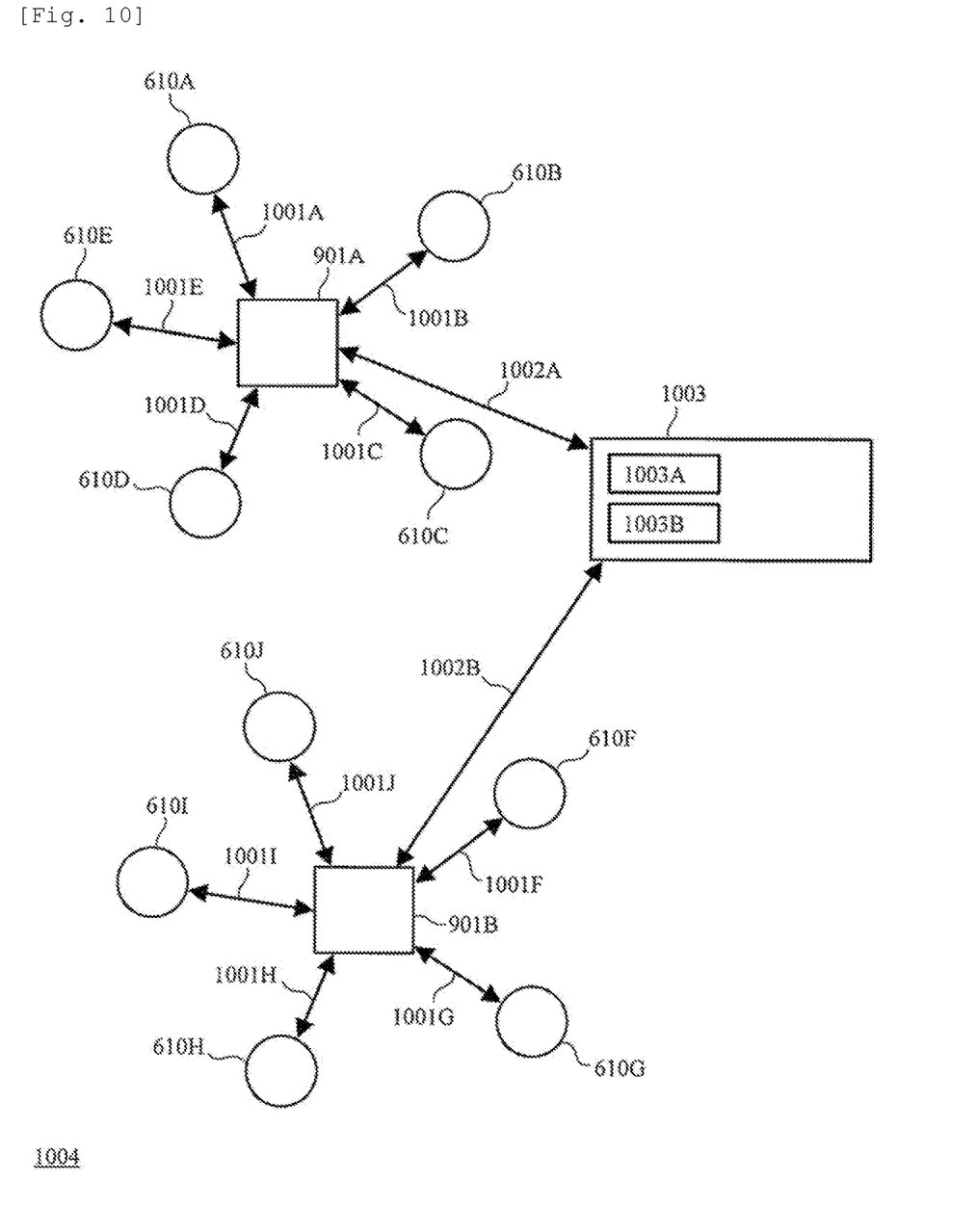
FIG. 10 is a view describing a construction example of the diagnosis system according to Example 3.

FIG. 10 illustrates an overall configuration example of a diagnosis system 1004 used for monitoring production lines. In addition, FIG. 10 illustrates a case where the deformation detecting devices 610A to 610E are connected to a repeater 901A in a wired communication manner, the deformation detecting devices 610F to 610J are connected to a repeater 901B and communicate with a central management device 1003 through the repeaters 901A and 901B. The central management device 1003 is configured with a storage device 1003A which stores data at the time of normal operation in each measurement target 113; a processing section 1003B which determines the state of the measurement target 113 based on a comparison result between the detection data input from each of the deformation detecting devices 610A to 610J and the data at the time of normal operation; and a storage device (not illustrated) which stores the detection data received from each of the deformation detecting devices 610A to 610J. However, the system configuration can also be applied to a case of communicating with the outside by the wireless communication method. In a case of employing the wireless communication method, communication by the multi-hop method is generally used.

In the production line, there are a plurality of devices to be monitored, such as a manufacturing device or an analyzing device for managing the product. It is difficult to manage the devices with one repeater. In this case, the repeater 901 having an individual tag (device ID) is provided for each device, and by a combination of the tag of the repeater 901 and the tag (attachment place or device ID) of the deformation detecting device 610, it is managed from which deformation detecting device 610 the data is received.

In the example of FIG. 10, the data of the deformation detecting devices 610A to 610E are collected by the repeater 901A, the data up to the deformation detecting devices 610F to 610J are collected by the repeater 901B, and then a synthetic tag (for example, (901A and 610A) and the like) which can be recognized by adding the tag of the repeater 901A or 901B is added to the tags of the deformation detecting devices 610A to 610J, and the data is transmitted to the central management device 1003. In other words, a diagnosis system 1004 which transmits the data from the ten deformation detecting devices 610A to 610J to the central management device 1003 by using the two repeaters 901A and 901B, and diagnoses the state of a plurality of devices which are measurement targets 113, is illustrated.

In addition, since problems, such as interference, occur when a plurality of deformation detecting devices 610 transmit a signal without an order, it is preferable that only the deformation detecting device 610 that has received a command from the repeater 901 transmits a signal having a standardized length, or a mechanism for changing a carrier wave on which the data is placed for each repeater 901 is employed.

(5) Application Mounting Example

As described above, the deformation detecting device 610 described in the above-described examples can be applied to various uses. For example, the deformation detecting device 610 can be installed in piping of a device for flowing cooling water, such as an oxidation furnace, a spatter, a dicer, or the like. Further, the deformation detecting device 610 can be installed in piping of a device for flowing a liquid, such as an automatic biochemical analyzer and an etching device. In addition, the deformation detecting device 610 can be adhered to a human body or a pet animal, and accordingly, a health management system for measuring body temperature, heartbeat, moisture, and the like can be constructed. Furthermore, the deformation detecting device 610 can be incorporated or adhered to a highly flexible object, such as a pet sheet, and accordingly, it is possible to construct a watching system that indirectly monitors the watching target state.

REFERENCE SIGNS LIST

101 . . . DETECTING DEVICE
102 . . . ELECTRODE ON UPPER SURFACE SIDE OF ORGANIC PIEZOELECTRIC SHEET
103 . . . ELECTRODE ON UPPER SURFACE SIDE OF ORGANIC PIEZOELECTRIC SHEET
104 . . . ORGANIC PIEZOELECTRIC SHEET
105 . . . ADHESIVE LAYER
106 . . . RUBBER ELASTIC SHEET
107 . . . ELECTRODE ON LOWER SURFACE SIDE OF ORGANIC PIEZOELECTRIC SHEET
108 . . . ELECTRODE ON LOWER SURFACE SIDE OF ORGANIC PIEZOELECTRIC SHEET
109 . . . EXTRACTION ELECTRODE PAD ON UPPER SURFACE SIDE OF ORGANIC PIEZOELECTRIC SHEET
110 . . . EXTRACTION ELECTRODE PAD ON UPPER SURFACE SIDE OF ORGANIC PIEZOELECTRIC SHEET
111 . . . EXTRACTION ELECTRODE PAD ON LOWER SURFACE SIDE OF ORGANIC PIEZOELECTRIC SHEET
112 . . . EXTRACTION ELECTRODE PAD ON LOWER SURFACE SIDE OF ORGANIC PIEZOELECTRIC SHEET
113 . . . MEASUREMENT TARGET
114 . . . ADHESIVE INTERFACE BETWEEN ORGANIC PIEZOELECTRIC SHEET AND RUBBER ELASTIC SHEET
115 . . . ADHESIVE INTERFACE BETWEEN RUBBER ELASTIC SHEET AND MEASUREMENT TARGET MOUNTING DEVICE
116 . . . FORCE APPLIED TO THE MEASUREMENT TARGET DEVICE
601 . . . EXTERNAL READER (R/W) PORTION
602 . . . ANTENNA (LEADER SIDE)
603 . . . ANTENNA (DEFORMATION DETECTING DEVICE SIDE)
604 . . . RF PORTION
605 . . . SIGNAL AND POWER FROM RF PORTION TOWARD CONTROL PORTION, AND SIGNAL FROM CONTROL PORTION TOWARD RF PORTION
606 . . . CONTROL PORTION
607 . . . SIGNAL FROM ANALOG PORTION TOWARD THE CONTROL PORTION AND ELECTRIC POWER FROM CONTROL PORTION TOWARD ANALOG PORTION
608 . . . ANALOG PORTION
609 . . . SIGNAL FROM SENSOR PORTION TOWARD ANALOG PORTION
610 . . . DEFORMATION DETECTING DEVICE
610A . . . DEFORMATION DETECTING DEVICE A
610B . . . DEFORMATION DETECTING DEVICE B
610C . . . DEFORMATION DETECTING DEVICE C

610D . . . DEFORMATION DETECTING DEVICE D
610E . . . DEFORMATION DETECTING DEVICE E
610F . . . DEFORMATION DETECTING DEVICE F
610G . . . DEFORMATION DETECTING DEVICE G
610H . . . DEFORMATION DETECTING DEVICE H
610I . . . DEFORMATION DETECTING DEVICE I
610J . . . DEFORMATION DETECTING DEVICE J
801 . . . FLEXIBLE WIRING
802 . . . ELECTRODE 1 OF FLEXIBLE WIRING
803 . . . ELECTRODE 2 OF FLEXIBLE WIRING
901 . . . REPEATER
903 . . . PIPING FOR WASTE LIQUID
904 . . . DRAIN HOLE
1001A . . . CONTROL/SENSOR SIGNAL AND POWER FLOW OF DEFORMATION DETECTING DEVICE A
1001B . . . CONTROL/SENSOR SIGNAL AND POWER FLOW OF DEFORMATION DETECTING DEVICE B
1001C . . . CONTROL/SENSOR SIGNAL AND POWER FLOW OF DEFORMATION DETECTING DEVICE C
1001D . . . CONTROL/SENSOR SIGNAL AND POWER FLOW OF DEFORMATION DETECTING DEVICE D
1001E . . . CONTROL/SENSOR SIGNAL AND POWER FLOW OF DEFORMATION DETECTING DEVICE E
1001F . . . CONTROL/SENSOR SIGNAL AND POWER FLOW OF DEFORMATION DETECTING DEVICE F
1001G . . . CONTROL/SENSOR SIGNAL AND POWER FLOW OF DEFORMATION DETECTING DEVICE G
1001H . . . CONTROL/SENSOR SIGNAL AND POWER FLOW OF DEFORMATION DETECTING DEVICE H
1001I . . . CONTROL/SENSOR SIGNAL AND POWER FLOW OF DEFORMATION DETECTING DEVICE I
1001J . . . CONTROL/SENSOR SIGNAL AND POWER FLOW OF DEFORMATION DETECTING DEVICE J
1003 . . . CENTRAL MANAGEMENT DEVICE
1003A . . . STORAGE DEVICE
1003B . . . PROCESSING SECTION
1004 . . . DIAGNOSIS SYSTEM

The invention claimed is:

1. A deformation detecting device, comprising:
a film-like elastic body which has a first surface to be adhered to a measurement target and a second surface opposite to the first surface, and in which the second surface has at least one set of a recess portion and a projection portion in a first direction in a static state;
a first electrode formed in a region of the recess portion of the second surface;
a second electrode formed in a region of the projection portion of the second surface;
a film-like piezoelectric body which has a uniform thickness and has a third surface disposed along the second surface of the elastic body and a fourth surface opposite to the third surface, and of which a shear modulus of elasticity is higher than that of the elastic body;
a third electrode formed in a region of the fourth surface opposite to the first electrode;
a fourth electrode formed in a region of the fourth surface opposite to the second electrode, and
a circuit which takes out information regarding both or one of a first signal generated between the first electrode and the fourth electrode and a second signal generated between the second electrode and the third electrode, as detection data, wherein:
the first signal is a current that flows between the first electrode and the fourth electrode or a voltage generated between the first electrode and the fourth electrode;
the second signal is a current that flows between the second electrode and the third electrode or a voltage generated between the second electrode and the third electrode; and
the deformation detecting device detects deformation in the first direction based on the detection data.

2. The deformation detecting device according to claim 1, further comprising:
a wired communication portion which transmits the detection data taken out from the circuit to the outside.

3. The deformation detecting device according to claim 1, wherein the recess portion and the projection portion are alternately arranged in the first direction.

4. The deformation detecting device according to claim 1, wherein the recess portion and the projection portion are continuously disposed in the first direction.

5. The deformation detecting device according to claim 1, wherein any of the first electrode, the second electrode, the third electrode, and the fourth electrode has a shape of comb teeth configured with a plurality of electrodes having a shape of comb teeth,
wherein the electrode having a shape of comb teeth configuring the first electrode and the electrode having a shape of comb teeth configuring the second electrode are alternately arranged in the first direction, and
wherein the electrode having a shape of comb teeth configuring the third electrode and the electrode having a shape of comb teeth configuring the fourth electrode are alternately arranged in the first direction.

6. The deformation detecting device according to claim 1, wherein the elastic body is a rubber elastic body.

7. The deformation detecting device according to claim 6, wherein the elastic body is silicone rubber.

8. The deformation detecting device according to claim 1, wherein the piezoelectric body is a gel film.

9. The deformation detecting device according to claim 1, wherein the piezoelectric body is a sputtered film.

10. The deformation detecting device according to claim 1, wherein the piezoelectric body is an organic piezoelectric sheet.

11. The deformation detecting device according to claim 1, further comprising:
a protective film which covers surfaces of the piezoelectric body, the third electrode, and the fourth electrode.

12. The deformation detecting device according to claim 1, wherein the circuit takes out an integrated value of the first signal and the second signal as the detection data.

13. The deformation detecting device according to claim 1, further comprising:
a wireless communication portion which transmits the detection data taken out from the circuit to the outside.

14. A diagnosis system, comprising:
one or a plurality of deformation detecting devices attached to a measurement target; and
a central management device including a storage device which stores data at the time of normal operation in the measurement target, and a processing section which determines a state of the measurement target based on a comparison result between detection data input from one or a plurality of the deformation detecting devices and data at the normal operation, wherein the deformation detecting device includes a film-like elastic body which has a first surface to be adhered to a measurement target and a second surface opposite to the first surface, and in which the second surface has at least one set of a recess portion and a projection portion in a first direction in a static state, a first electrode formed in a region of the recess portion of the second surface, a second electrode formed in a region of the projection portion of the second surface, a film-like piezoelectric body which has a uniform thickness and has a third surface disposed along the second surface of the elastic body and a fourth surface opposite to the third surface, and of which a shear modulus of elasticity is higher than that of the elastic body, a third electrode formed in a region of the fourth surface opposite to the first electrode, a fourth electrode formed in a region of the fourth surface opposite to the second electrode, and a circuit which takes out information regarding both or one of a first signal generated between the first electrode and the fourth electrode and a second signal generated between the second electrode and the third electrode, as detection data, wherein:

the first signal is a current that flows between the first electrode and the fourth electrode or a voltage generated between the first electrode and the fourth electrode;

the second signal is a current that flows between the second electrode and the third electrode or a voltage generated between the second electrode and the third electrode, and the deformation detecting device detects deformation in the first direction based on the detection data.

15. The diagnosis system according to claim 14, wherein the processing section receives an integrated value of the first signal and the second signal as the detection data.

* * * * *